(12) United States Patent
Ooe et al.

(10) Patent No.: US 8,974,978 B2
(45) Date of Patent: Mar. 10, 2015

(54) SOLID OXIDE FUEL CELL DEVICE

(75) Inventors: Toshiharu Ooe, Kitakyushu (JP);
Tsukasa Shigezumi, Kitakyushu (JP);
Katsuhisa Tsuchiya, Kitakyushu (JP);
Kiyotaka Nakano, Kitakyushu (JP);
Yoshiyuki Kawamura, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 358 days.

(21) Appl. No.: 12/787,851

(22) Filed: May 26, 2010

(65) Prior Publication Data
US 2010/0304241 A1    Dec. 2, 2010

(30) Foreign Application Priority Data

May 28, 2009   (JP) .................. 2009-129164

(51) Int. Cl.
*H01M 8/04*     (2006.01)
*C01B 3/38*     (2006.01)
*H01M 8/06*     (2006.01)
*H01M 8/24*     (2006.01)
*H01M 8/12*     (2006.01)

(52) U.S. Cl.
CPC .......... *H01M 8/04776* (2013.01); *C01B 3/384* (2013.01); *H01M 8/04022* (2013.01); *H01M 8/04223* (2013.01); *H01M 8/0432* (2013.01); *H01M 8/04373* (2013.01); *H01M 8/04753* (2013.01); *H01M 8/0612* (2013.01); *H01M 8/243* (2013.01); *C01B 2203/0233* (2013.01); *C01B 2203/0244* (2013.01); *C01B 2203/0261* (2013.01); *C01B 2203/066* (2013.01); *C01B 2203/0811* (2013.01); *C01B 2203/1058* (2013.01); *C01B 2203/1064* (2013.01); *C01B 2203/1258* (2013.01);

(Continued)

(58) Field of Classification Search
USPC .................................. 429/400–535
See application file for complete search history.

(56) References Cited

U.S. PATENT DOCUMENTS

2004/0058230 A1 *   3/2004   Hsu ................................ 429/62
2005/0208664 A1 *   9/2005   Keegan et al. ................. 436/55

(Continued)

FOREIGN PATENT DOCUMENTS

EP    1408003 A1    4/2004
EP    1808927 A1    7/2007

(Continued)

OTHER PUBLICATIONS

Extended European Search Report for European Application No. 10164032.4, dated Sep. 2, 2010, 8 pages.

*Primary Examiner* — Kenneth Douyette
*Assistant Examiner* — James Lee
(74) *Attorney, Agent, or Firm* — Brinks Gilson & Lione

(57) ABSTRACT

The present invention comprises a fuel cell assembly, a reformer, a fuel flow rate regulator unit for supplying fuel gas to the reformer, a reforming air supply device, a power generating air supply device, and a control unit for igniting fuel gas using an ignition device and conducting a combustion operation causing the fuel gas to combust using power generating air, then sequentially implementing a POX operation, ATR operation, and SR operation; whereby the control section starts the supply of fuel gas, reforming air, and power generating air, then controls the fuel gas supply device, the reforming air supply device, and the power generating air supply device to hold constant the respective supply flow rates of fuel gas, reforming air, and power generating air, without variation, in the combustion operating region in which fuel gas is ignited by the ignition device and combusted.

8 Claims, 9 Drawing Sheets

(52) U.S. Cl.
CPC .......... *C01B 2203/1604* (2013.01); *C01B 2203/1609* (2013.01); *C01B 2203/1619* (2013.01); *C01B 2203/1685* (2013.01); *C01B 2203/169* (2013.01); *H01M 2008/1293* (2013.01); *Y02E 60/50* (2013.01); *Y02E 60/525* (2013.01)
USPC ........................................ 429/423; 429/429

(56) References Cited

U.S. PATENT DOCUMENTS

| | | |
|---|---|---|
| 2008/0248342 A1 | 10/2008 | Takahashi et al. |
| 2011/0053017 A1* | 3/2011 | Takahashi .................. 429/423 |

FOREIGN PATENT DOCUMENTS

| | | | |
|---|---|---|---|
| EP | 1840997 A1 | 10/2007 | |
| EP | 2199255 A1 | 6/2010 | |
| JP | 2007-128717 A | 5/2007 | |
| JP | 2008-135268 A | 6/2008 | |
| WO | WO 02/05363 A2 | 1/2002 | |
| WO | WO 02/05363 A3 | 1/2002 | |
| WO | WO 2009/028327 A1 | 3/2009 | |
| WO | WO 2009/028427 A1 * | 5/2009 | .......... H01M 8/04 |

* cited by examiner

FIG.9

| MODE | STATE | FUEL FLOW RATE (L/min) | REFORMING AIR FLOW RATE (L/min) | POWER GENERATING AIR FLOW RATE (L/min) | WATER FLOW RATE (cc/min) | TEMPERATURE CONDITIONS FOR TRANSITION (°C) | |
|---|---|---|---|---|---|---|---|
| | | | | | | REFORMER | STACK |
| STARTUP MODE | COMBUSTION OPERATION | 6.0 | 10.0 | 100.0 | 0.0 | 300°C OR ABOVE | – |
| | POX1 | 6.0 | 10.0 | 100.0 | 0.0 | 350°C OR ABOVE | – |
| | POX2 | 6.0 | 18.0 | 100.0 | 0.0 | 600°C OR ABOVE | 250°C OR ABOVE |
| | ATR1 | 6.0 | 8.0 | 100.0 | 2.0 | 600°C OR ABOVE | 400°C OR ABOVE |
| | ATR2 | 4.0 | 4.0 | 100.0 | 3.0 | 650°C OR ABOVE | 600°C OR ABOVE |
| | SR1 | 3.0 | 0.0 | 100.0 | 8.0 | 650°C OR ABOVE | 700°C OR ABOVE |
| | SR2 | 2.3 | 0.0 | 80.0 | 5.8 | 650°C OR ABOVE | 700°C OR ABOVE |

# SOLID OXIDE FUEL CELL DEVICE

RELATED APPLICATIONS

This application claims priority under 35 U.S.C. §119 to Japanese Patent Application No. 2009-129164 filed on May 28, 2009, the entire content of which is hereby incorporated by reference.

BACKGROUND OF THE INVENTION

1. Technical Field

The present invention relates to a solid oxide fuel cell ("SOFCs" below) device, and more particularly to a solid oxide fuel cell device for generating power by reacting fuel gas with air.

2. Description of the Related Art

Solid oxide fuel cells (SOFC) device operate at relatively high temperatures, using an oxide ion-conducting solid electrolyte as an electrolyte, with electrodes placed on each side thereof, and with fuel gas supplied to one side thereof and an oxidant (air, oxygen, or the like) supplied to the other side thereof.

In such SOFC, steam or $CO_2$ is produced by the reaction between oxygen ions and fuel passed through the oxide ion-conducting solid electrolyte, thereby generating power and thermal energy. The electrical power is removed from the SOFC device, where it is used for various electrical purposes. The thermal energy is transferred to the fuel, the SOFC device, the oxidant, and the like, and is used to raise the temperature thereof.

In conventional SOFC, the power generating chamber is disposed beneath a sealed space within the fuel cell module, and a fuel cell assembly furnished with multiple fuel cells is disposed within this power generating chamber. A combustion chamber is formed above this fuel cell assembly; residual fuel gas and oxidant gas (air) combust directly in the upper portion itself of the fuel cell assembly, and exhaust gas is produced within the combustion chamber.

A reformer for reforming fuel gas into hydrogen is disposed at the top of the combustion chamber, and the reformer is heated by the heat of combustion within the combustion chamber to a temperature sufficient to perform reforming.

However, in the conventional SOFC of this type, other than directly combusting the residual fuel gas and oxidant gas at the top portion itself of the fuel cell assembly, no heating means such as a burner was provided to separately heat the combustion chamber or the reformer, or to ignite fuel gas at the upper portion of the fuel cell assembly during cold starts in order to start the fuel cell module at essentially the outside temperature or a temperature below the outside temperature, or to support the prevention of flameout or blow out after ignition, and so forth. It was therefore extremely difficult to perform reliable uniform ignition over the entirety of the multiple fuel cells which may exceed 100 in number, due to formation defects in the ignition portion caused by variability in the structure of the cell itself, and in particular, the effects of unstable airflows within the combustion chamber when cold starting the fuel cell module at a temperature which is essentially the same as the outside temperature or below the outside temperature; even if ignition occurs, flameout can occur due to the slightest turbulence in air flow and the like, making it extremely difficult to achieve a stable ignition or maintain an ignited state.

To suppress ignition deficiencies of this type, it has been proposed in Japanese Patent Unexamined Publication No. 2008-135268 (JP-2008-135268A) and the like that such ignition problems caused by airflow could be suppressed by reducing the supply flow rate of the air which threatens to blow out the flame when the fuel cell ignites.

SUMMARY OF THE INVENTION

However, the present inventors have found that when the flow rate of air supplied to the fuel cells is reduced as a countermeasure to suppress ignition problems in the aforementioned JP-2008-135268A at the time of the ignition action, i.e., immediately prior to fuel cell ignition, it is not possible to form a stable air flow over the entirety of the multiple fuel cells, and even if ignition occurs in a portion of the multiple cells, it is difficult to cause the ignited flame to ride the airflow and diffuse across all of the remaining cells. Increasing the air volume after ignition may cause increased air flow turbulence, leading to the significant problem that ignition is easily extinguished in the upper portion of the cells where ignition characteristics are poor.

Thus in the aforementioned JP-2008-135268A, while there is an increase of the flow rate of fuel supplied to the fuel cell during ignition, there is no disclosure or suggestion of a technical approach to stabilize airflow, and the new problem described above is not resolved.

It is therefore an object of the present invention to provide a solid oxide fuel cell (SOFC) device capable of reliably suppressing ignition problems and reliably preventing flameout subsequent to ignition using a simple structure, without employing countermeasures such as modifying the fuel cell assembly (fuel cell) structure itself to facilitate ignition.

The above object is achieved according to the present invention by providing a solid oxide fuel cell device for generating power by reacting fuel gas and air, comprising: a fuel cell assembly furnished with multiple solid electrolyte-type fuel cells; a reformer disposed above the fuel cell assembly for steam reforming fuel gas and supplying the fuel gas to the fuel cell assembly; a fuel gas supply device for supplying the fuel gas to the reformer; a water supply device for producing pure water and supplying the pure water to the reformer; a reforming air supply device for supplying reforming air to the reformer; a power generating air supply device for supplying power generating air to the upper portion of the fuel cell assembly through the space between the multiple fuel cells in the fuel cell assembly; an ignition device for igniting and combusting the fuel gas supplied to the lower portion of the fuel cell assembly from the reformer and reaching the upper portion of the fuel cell assembly; and a control device for controlling the fuel gas supply device, the water supply device, the reforming air supply device, the power generating air supply device, and the ignition device to start the solid oxide fuel cell device by implementing a combustion operation using the ignition device to cause ignition and combust the fuel gas with the air, then supplying the fuel gas and the reforming air into the reformer to conduct a partial oxidation reforming reaction (POX) operation, then supplying the fuel gas, the reforming air and the water into the reformer to conduct an auto-thermal reforming reaction (ATR) operation, then supplying the fuel gas and water into the reformer to conduct a steam reforming reaction (SR) operation, wherein the control device controls the fuel gas supply device, the reforming air supply device and the power generating air supply device so that supply flow rates of fuel gas, reforming air and power generating air are held constant without variation in the combustion operation region in which the ignition device causes the ignition and combust the fuel gas after starting the supply of the fuel gas, the reforming air and the power generating air.

It is very difficult, as is true for the combustion chamber atmosphere in the combustion operating region, to achieve stable combustion without flameout or blow out using ignition at the upper portion of the fuel cell assembly in a low temperature atmosphere in which the fuel cells in the fuel cell assembly do not ignite naturally. However, in the present invention thus constituted, in the combustion operating region, the respective supply flow rates of fuel gas, reforming air and power generating air are held in a constant state without variation. This enables a stable flame diffusion to be achieved in the fuel cell assembly, so that ignition can be reliably achieved, and inadvertent post-ignition flameout can be prevented. Ignition problems can be suppressed, as can unstable combustion and production of CO, using a simple control, without employing countermeasures such as modifying the fuel cell assembly (fuel cell) structure itself to facilitate ignition.

In a preferred embodiment of the present invention, in the POX operating region, the control device controls the fuel gas supply device, the power generating air supply device, and the reforming air supply device to hold constant the supply flow rates of fuel gas and power generating air, and to increase the supply flow rate of reforming air.

In the present invention thus constituted, only the flow rate of reforming air supplied is increased in the POX operating region following the combustion operation, therefore since the reforming air used in the POX can be secured, the POX can be effectively carried out; by holding constant the respective supply flow rates of fuel gas and reforming air, and generating the air without variation in the combustion operating region, which is the last precursor stage to the POX region, the air flow is made stable even in environments where natural ignition is difficult, so it is expected that this will be an effective measure in the suppression of ignition problems and flameout.

In another preferred embodiment of the present invention, the control device controls the reforming air supply device so as not to increase reforming air flow rate during a predetermined interval following the transition from the combustion operating region to the POX operating region.

In the present invention thus constituted, the reforming air is used for POX operation at the start of the POX operation, such as the flow rate of reforming air used for combustion of fuel gas is reduced and combustion becomes unstable, but further changes in air flow are suppressed by not increasing the flow rate of reforming air during a predetermined interval following the transition into the region in which POX operation is possible, therefore destabilization of combustion and production of CO and the like can be suppressed.

In still another preferred embodiment of the present invention, the control device implements a first auto-thermal reforming reaction (ATR1) operation in the ATR operating region, then implements a second auto-thermal reforming reaction (ATR2) operation in a temperature region higher than, and with a smaller flow rate of reforming air and a larger flow rate of water than, those of the first auto-thermal reforming reaction (ATR1), and the control device further controls the fuel gas supply device to hold the supply flow rate of fuel gas in a constant state, without variation, in the combustion operating region, the POX operating region, and the ATR1 operating region.

In the present invention thus constituted, the supply flow rate of fuel gas is held constant without variation in the combustion operating region, the POX operating region, and the ATR1 operating region, therefore the temperatures of the reformer, the combustion chamber, and the fuel cells become relatively high, and a state of plentiful fuel gas supply quantity is stably maintained up to the ATR1 operating region, which approaches the temperature at which the fuel gas naturally ignites, thus preventing flameout.

In another preferred embodiment of the present invention, the control device controls the generating air supply device to hold constant the supply flow rate of power generating air, without variation, in at least the combustion operating region, the POX operating region, and the ATR operating region.

In the present invention thus constituted, a stable state is maintained in which there is a plentiful supply quantity of fuel gas, so that ignition performance and flameout suppression performance are improved and, because the flow rate of power generating air is held constant without variation in at least the combustion operating region, the POX operating region, and the ATR operating region, flame diffusion performance can be improved, all of the fuel cells can be ignited, and post-ignition combustion can be stabilized, therefore the production of CO and the like can be suppressed.

In another preferred embodiment of the present invention, the control device controls the power generating air supply device to supply power generating air in the combustion operating region, the POX operating region, the ATR operating region, and the SR operating region, and further controls the generating air supply device to supply a maximum and fixed flow rate of power generating air in at least the combustion operating region.

In the present invention thus constituted, the control device controls the power generating air supply device to supply power generating air in the combustion operating region, the POX operating region, the ATR operating region, and the SR operating region, and in addition controls the generating air supply device to supply a maximum and fixed flow rate of generating air in at least the combustion operating region, therefore a stable air flow state can be created using a fixed flow rate of power generating air even if the power generating air being supplied is the maximum flow rate; ignition can be reliably implemented and good flame diffusion characteristics can be secured. In particular, even in an environment in which it is extremely difficult to suppress the production of CO due to the poor ignition characteristic environment directly above the cell, it is possible to reduce the CO concentration to a safe level. In addition, the philosophy of stabilizing airflow by holding constant the supply flow rate of power generating air enables the effects of the air flow increase to be suppressed and flame diffusion characteristics to be improved so that complete ignition in the upper portion of the fuel-cell assembly can be achieved.

The above object is also achieved according to the present invention by providing a solid oxide fuel cell device for generating power by reacting fuel gas and air, comprising: a fuel cell assembly furnished with multiple solid electrolyte-type fuel cells; a reformer disposed above the fuel cell assembly for steam reforming fuel gas and supplying the fuel gas to the fuel cell assembly; means for supplying the fuel gas to the reformer; means for producing pure water and supplying the pure water to the reformer; means for supplying reforming air to the reformer; means for supplying power generating air to the upper portion of the fuel cell assembly through the space between the multiple fuel cells in the fuel cell assembly; means for igniting and combusting the fuel gas supplied to the lower portion of the fuel cell assembly from the reformer and reaching the upper portion of the fuel cell assembly; and means for controlling the fuel gas supply means, the water supply means, the reforming air supply means, the power generating air supply means, and the igniting means to start the solid oxide fuel cell device by implementing a combustion operation using the ignition device to cause ignition and combust the fuel gas with the air, then supplying the fuel gas and the reforming air into the reformer to conduct a partial oxidation reforming reaction (POX) operation, then supplying the fuel gas, the reforming air and the water into the reformer to conduct an auto-thermal reforming reaction (ATR) operation, then supplying the fuel gas and water into the reformer to conduct a steam reforming reaction (SR) operation, wherein the control means controls the fuel gas supply means, the reforming air supply means and the power generating air supply means so that supply flow rates of fuel gas, reforming air and power generating air are held constant without variation in the combustion operation region in which the igniting means causes the ignition and combust the fuel gas after starting the supply of the fuel gas, the reforming air and the power generating air.

The solid oxide fuel cell (SOFC) device of the present invention enables the suppression of ignition problems and the prevention of post-ignition flameout using a simple structure, without the adoption of countermeasures such as modifying the structure itself of the fuel cell assembly (fuel cells) to facilitate ignition.

The above and other objects and features of the present invention will be apparent from the following description by taking reference with accompanying drawings employed for preferred embodiments of the present invention.

BRIEF DESCRIPTION OF THE DRAWINGS

In the accompanying drawings:

FIG. 9 is an operation table showing an example of a startup processing procedure for a solid oxide fuel cell (SOFC) device according to an embodiment of the present invention.

DETAILED DESCRIPTION OF THE PREFERRED EMBODIMENTS

Next, referring to the attached drawings, a solid oxide fuel cell (SOFC) device according to an embodiment of the present invention will be explained.

Figure 1:
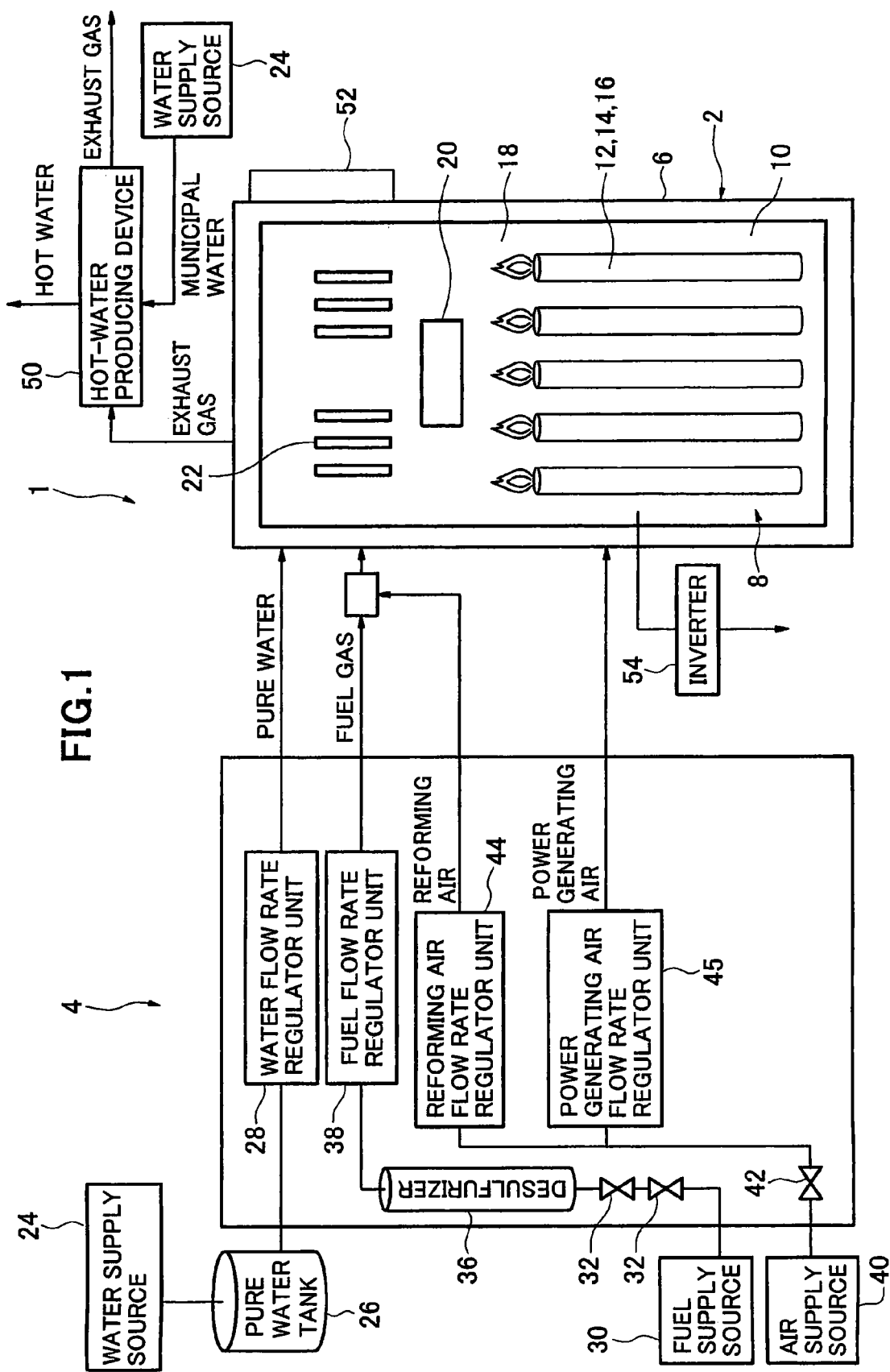
FIG. 1 is an overview schematic view showing a solid oxide fuel cell (SOFC) device according to an embodiment of the present invention.

As shown in FIG. 1, a solid oxide fuel cell (SOFC) device according to an embodiment of the present invention is furnished with a fuel cell module 2 and an auxiliary unit 4.

The fuel cell module 2 is furnished with a housing 6; a sealed space 8 is formed within the housing 6, mediated by insulating material (not shown, however the insulating material is not an indispensable structure and may be omitted). Note that it is acceptable to provide no insulating material. A fuel cell assembly 12 for carrying out the power generating reaction between fuel gas and oxidant (air) is disposed in the power generating chamber 10 at the lower portion of this sealed space 8. This fuel cell assembly 12 is furnished with ten fuel cell stacks 14 (see FIG. 5), and the fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned power generating chamber 10 in the sealed space 8 of the fuel cell module 2. Residual fuel gas and residual oxidant (air) not used in the power generation reaction is combusted in this combustion chamber 18 to produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving the heat of combustion and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate (litter per minute) of water supplied from the reservoir tank. The auxiliary unit 4 is further furnished with a gas shutoff valve 32 for shutting off the fuel gas supply from a fuel supply source 30 such as municipal gas or the like, a desulfurizer 36 for desulfurizing the fuel gas, and a fuel gas flow rate regulator unit 38 (a "fuel pump" or the like driven by a motor) for regulating the flow rate (litter per minute) of fuel gas. Furthermore, an auxiliary unit 4 is furnished with an electromagnetic valve 42 for shutting off air serving as an oxidant and supplied from an air supply source 40, and a reforming air flow rate regulator unit 44 and generating air flow rate regulator unit 45 ("air blower" or the like driven by a motor) for regulating air flow rate (litter per minute).

Note that in the SOFC device according to the embodiment of the present invention, there is no heating means such as a heater for heating the reforming air supply to the reformer 20 or the power generating air supply to the power generating chamber 10 in order to efficiently raise the temperature at startup, nor is there a heating means for separately heating the reformer 20.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater (not shown).

The fuel cell module 2 is provided with a control box 52 for controlling the supply flow rates of fuel gas and the like.

Furthermore, an inverter 54 serving as an electrical power extraction unit (electrical power conversion unit) for supplying electrical power generated by the fuel cell module to the outside is connected to the fuel cell module 2.

Figure 2:
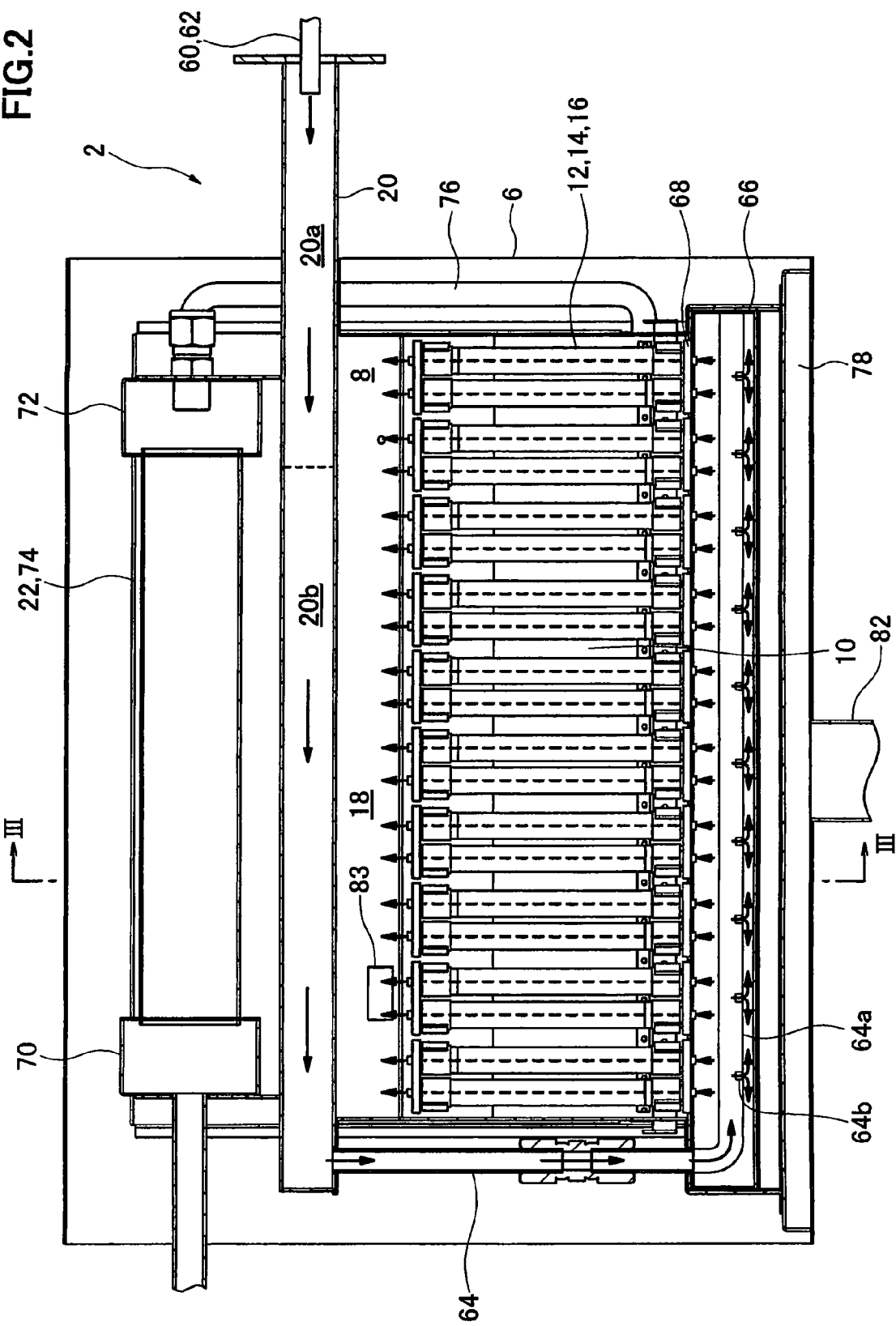
FIG. 2 is a front sectional view showing a solid oxide fuel cell (SOFC) device according to an embodiment of the present invention.
Figure 3:
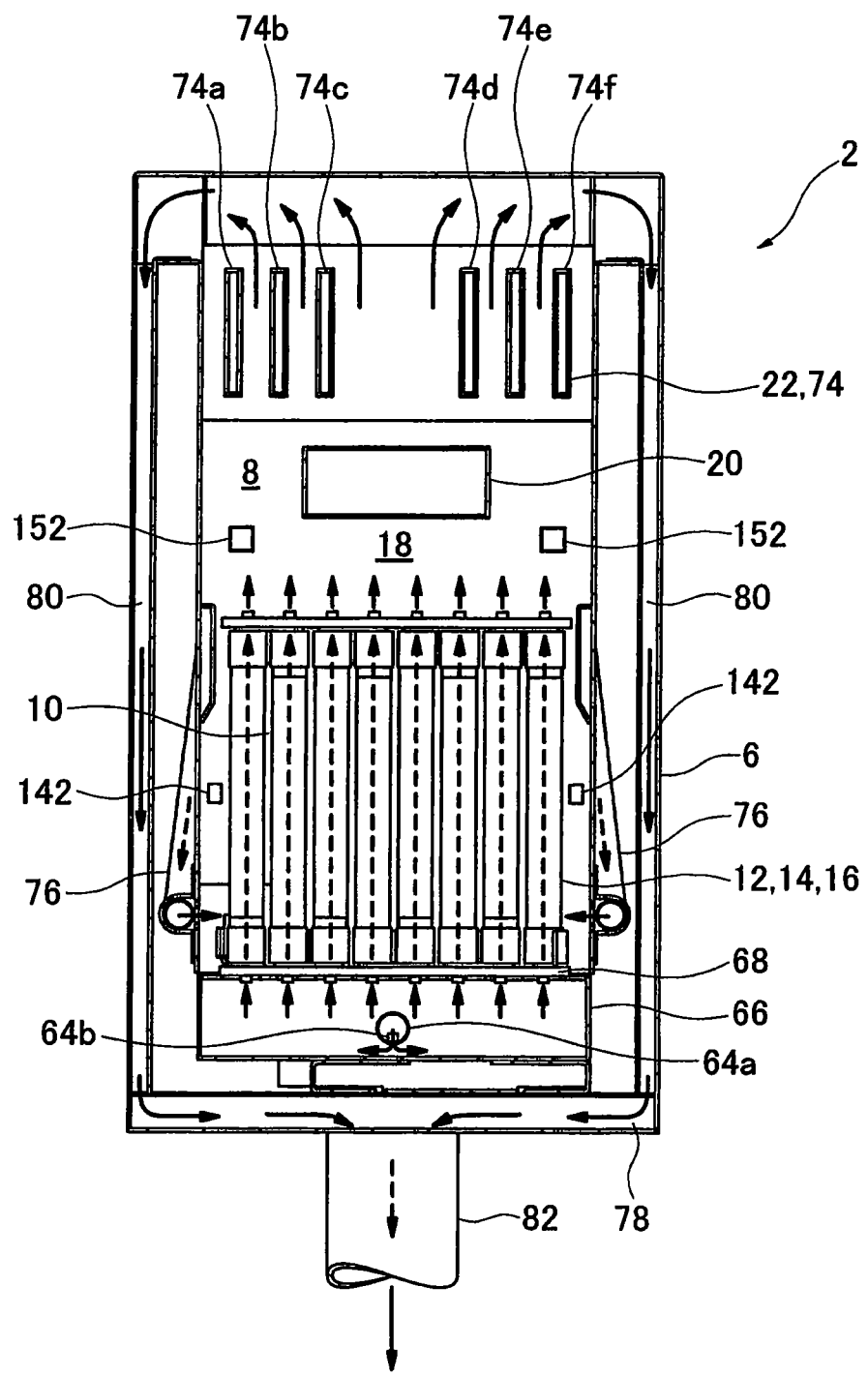
FIG. 3 is a sectional view seen along a line III-III of FIG. 2.

The internal structure of the solid oxide fuel cell (SOFC) device according to the embodiment of the present invention is explained using FIGS. 2 and 3.

As shown in FIGS. 2 and 3, a fuel cell assembly 12, a reformer 20, and an air heat exchanger 22 are arranged in sequence starting from the bottom in the sealed space 8 within the fuel cell module 2 housing 6, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of alumina spheres, or ruthenium is imparted to alumina spheres.

A fuel gas supply line 64 is connected to the downstream end of the reformer 20; this fuel gas supply line 64 extends downward, then further extends horizontally within a manifold formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

An air heat exchanger 22 is provided over the reformer 20. The air heat exchanger 22 is furnished with an air concentration chamber 70 on the upstream side and two air distribution chambers 72 on the downstream side; the air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top inside of the exhaust gas conduit 80 communicates with the space in which the air heat exchanger to rule 22 is disposed, and the bottom end side communicates with the exhaust gas chamber 78. An exhaust gas discharge pipe 82 is connected at approximately the center of the bottom surface of the exhaust gas chamber 78; the downstream end of the exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18. No heating means such as a burner or the like for separately heating the combustion chamber 18 or the fuel cell unit 16 to support ignition at startup or prevent flameout or blow out is provided on the combustion chamber 18.

Figure 4:
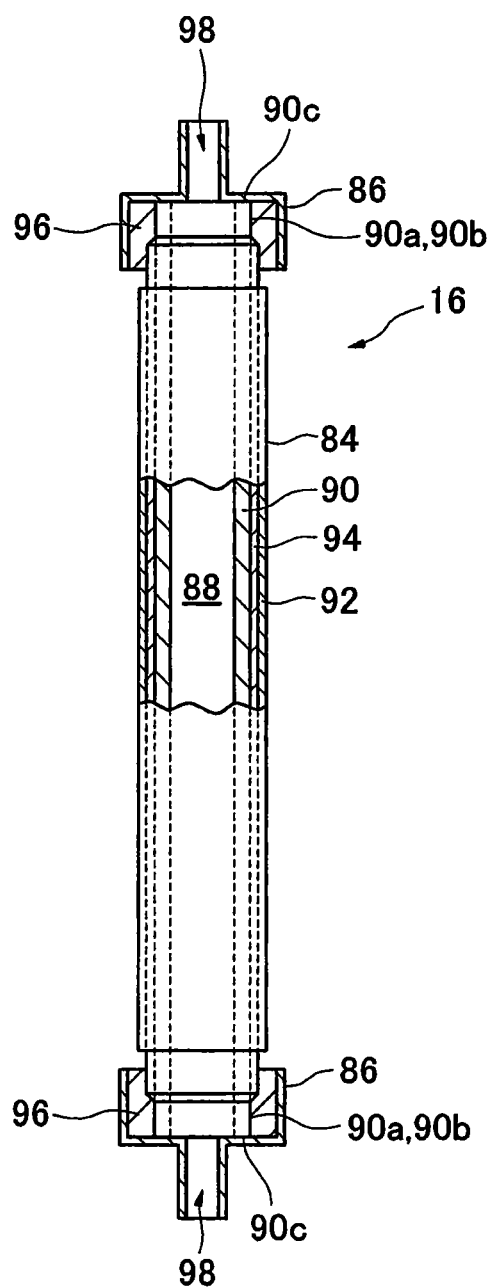
FIG. 4 is a partial sectional view showing a fuel cell unit of a solid oxide fuel cell (SOFC) device according to an embodiment of the present invention.

Next, referring to FIG. 4, the fuel cell unit 16 will be explained. As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. The internal electrode layer 90 is a fuel electrode through which fuel gas passes, and is a (−) pole, while the external electrode layer 92 is an air electrode for contacting the air, and is a (+) pole.

The internal electrode terminals 86 attached at the top and bottom ends of the fuel cell unit 16 have the same structure, therefore the internal electrode terminal 86 attached at the top end side will be specifically explained. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with fuel gas flow path 88 in the inside electrode layer 90 is formed at the center portion of the inside electrode terminal 86.

The inside electrode layer 90 is formed, for example, from at least one of a mixture of Ni and zirconia doped with at least one type of rare earth element selected from among Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; Ag, or the like.

Figure 5:
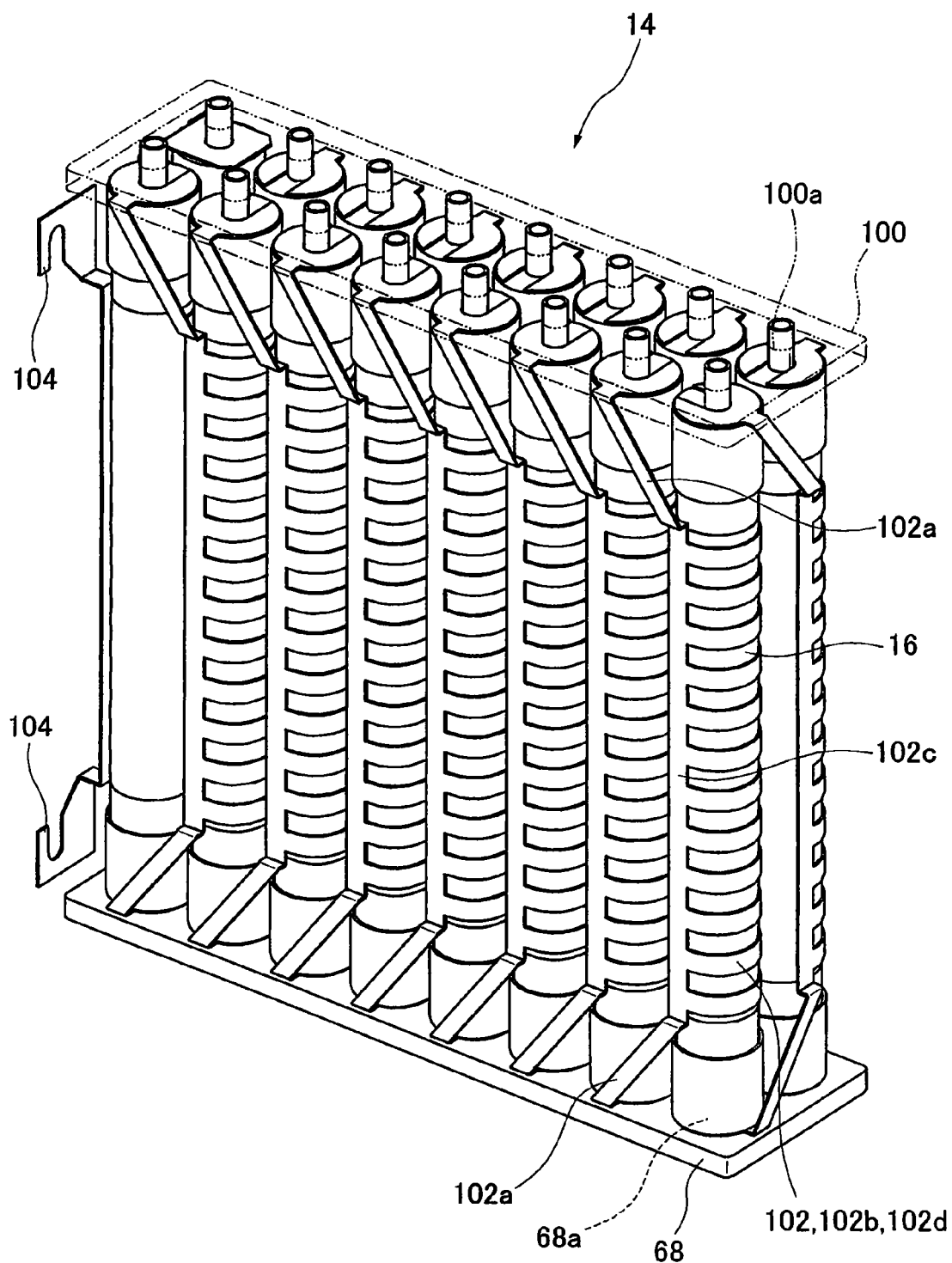
FIG. 5 is a perspective view showing a fuel cell stack of a solid oxide fuel cell (SOFC) device according to an embodiment of the present invention.

Next, referring to FIG. 5, the fuel cell stack 14 will be explained. As shown in FIG. 5, the fuel cell stack 14 is furnished with sixteen fuel cell units 16; the top sides and bottom sides of these fuel cell units 16 are respectively supported by a lower support plate 68 and upper support plate 100. Through holes 68a and 100a, through which the inside electrode terminal 86 can penetrate, are provided on the lower support plate 68 and upper support plate 100.

In addition, a current collector 102 and an external terminal 104 are attached to the fuel cell unit 16. The current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from the vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, inside electrode terminals 86 at the top and bottom ends of the two fuel cell units 16 positioned at the end of the fuel cell stack 14 (at the front and back sides on the left edge in FIG. 5) are respectively connected to the external terminals 104. These external terminals 104 are connected to the external terminals 104 (not shown) at the ends of the adjacent fuel cell stack 14, and as described above, all of the 160 fuel cell units 16 are connected in series.

Next, referring to FIG. 6, the sensors attached to the solid oxide fuel cell (SOFC) device according to the embodiment of the present invention will be explained.

Figure 6:
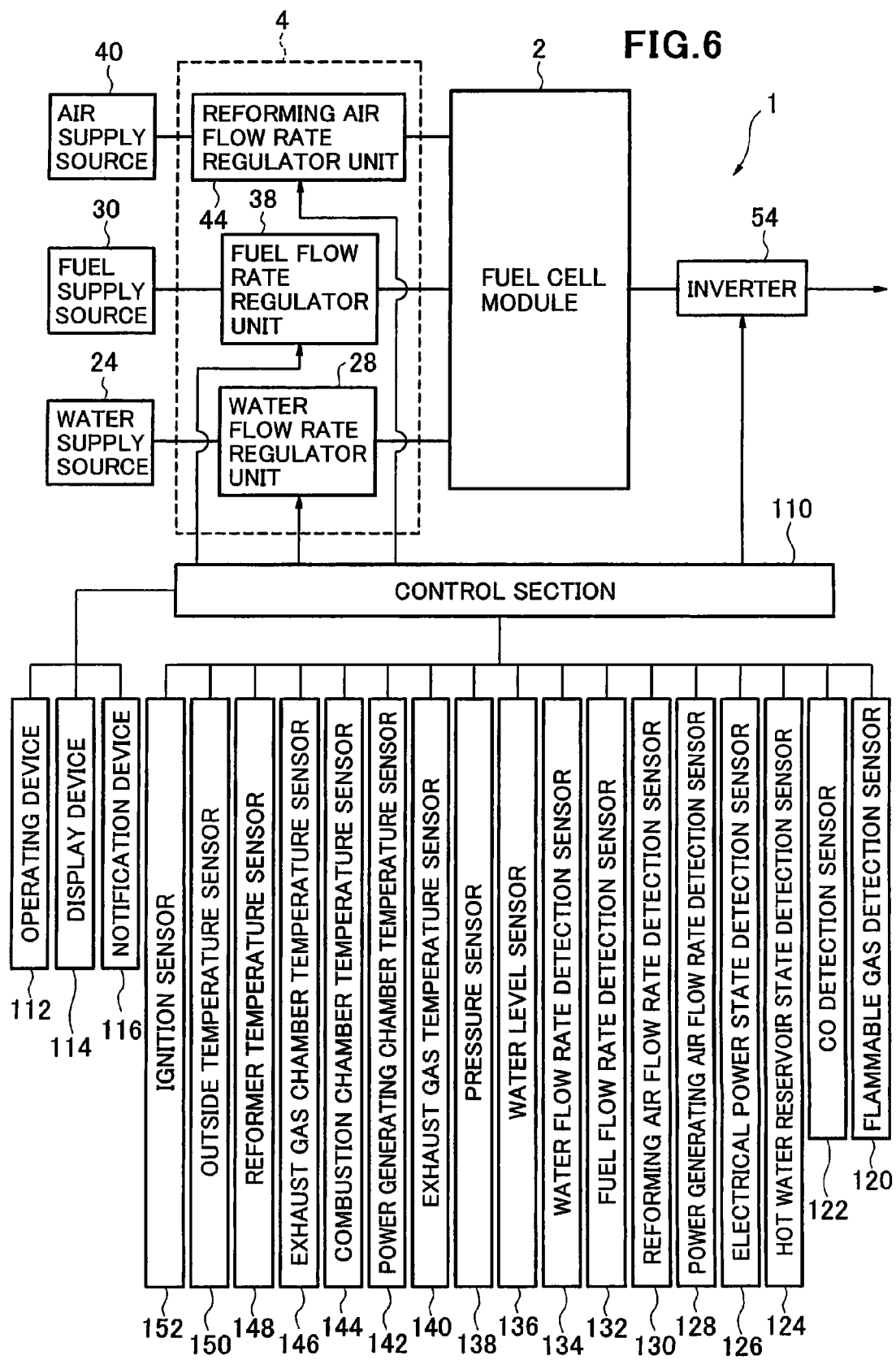
FIG. 6 is a block diagram showing a solid oxide fuel cell (SOFC) device according to an embodiment of the present invention.

As shown in FIG. 6, a solid oxide fuel cell device 1 is furnished with a control unit 110, an operating device 112 provided with operating buttons such as "ON" or "OFF" for user operation, a display device 114 for displaying various data such as a generator output value (Watts), and a notification device 116 for issuing warnings during abnormal states and the like are connected to the control unit 110. The notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the flammable gas detection sensor 120 is to detect leakage of CO in the exhaust gas, which is meant to be exhausted to the outside via the exhaust gas conduit 80 and the like, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A power generating air flow rate detection sensor 128 detects the flow rate of power generating air supplied to the generating chamber 10.

A reforming air flow rate sensor 130 detects the flow rate of reforming air supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell (SOFC) device is placed outdoors, the outside temperature sensor 150 detects the temperature of the outside atmosphere. Sensors to detect outside atmospheric humidity and the like may also be provided.

As shown in FIG. 3, ignition sensors 152 are provided in several locations near the top end portion of the fuel cell assembly 12, and function to detect the temperature around the top end portion of the fuel cell assembly 12 when the ignition device 83 is ignited, and to determine the ignition state based on the temperature.

Signals from these various sensors are sent to the control unit 110; the control unit 110 sends control signals to the water flow rate regulator unit 28, the fuel flow rate regulator unit 38, the reforming air flow rate regulator unit 44, and the power generating air flow rate regulator unit 45 based on data from the sensors, and controls the flow rates in each of these units.

The control unit 110 sends control signals to the inverter 54 to control the supplied electrical power.

Next, referring to FIG. 7, the operation of a solid oxide fuel cell (SOFC) device according to the present embodiment at the time of startup will be explained.

In order to warm up the fuel cell module 2, the operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 to the reformer 20 on the fuel cell module 2. At the same time, power generating air is supplied from the generating air flow rate regulator unit 45 to an air heat exchanger 22 of the fuel cell module 2, and the power generating air reaches the generating chamber 10 and the combustion chamber 18.

Immediately thereafter, fuel gas is also supplied from the fuel flow rate regulator unit 38, and fuel gas into which reforming air is blended passes through the reformer 20, the fuel cell stack 14, and the fuel cell unit 16 to reach the combustion chamber 18.

Next, ignition is brought about by the ignition device 83, and fuel gas and air (reforming air and power generating air) supplied to the combustion chamber 18 is combusted. This combustion of fuel gas and air produces exhaust gas; the generating chamber 10 is warmed by the exhaust gas, and when the exhaust gas rises into the fuel cell module 2 sealed space 8, the fuel gas, which includes the reforming air in the reformer 20 is warm, as is the power generating air inside the air heat exchanger 22.

At this point, fuel gas into which the reforming air is blended is supplied to the reformer 20 by the fuel flow rate regulator unit 38 and the reforming air flow rate regulator unit 44, therefore the partial oxidation reforming reaction POX given by Expression (1) proceeds in the reformer 20. This partial oxidation reforming reaction POX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the temperature of the combustion chamber 18 has risen by the combustion of the fuel gas and air, and the fuel cell stack 14 is therefore heated from the upper side such that the temperature of the fuel cell stack 14 can be raised in an essentially uniform manner in the vertical direction. Even though the partial oxidation reforming reaction POX is progressing, the ongoing combustion reaction between fuel gas and air is continued in the combustion chamber 18.

When the reformer temperature sensor 148 detects that the reformer 20 has reached a predetermined temperature (e.g. 600° C.) after the start of the partial oxidation reforming reaction POX, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction POX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction POX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, there will be no major drop in temperature. Also, the combustion reaction continues within the combustion chamber 18 even as the auto-thermal reforming reaction ATR proceeds.

When the reformer temperature sensor 146 detects that the reformer 20 has reached a predetermined temperature (e.g., 700° C.) following the start of the auto-thermal reforming reaction ATR shown as Expression (2), the supply of reforming air by the reforming air flow rate regulator unit 44 is stopped, and the supply of steam by the water flow rate regulator unit 28 is increased. By this means, a gas containing no air and only containing fuel gas and steam is supplied to the reformer 20, where the steam reforming reaction SR of Expression (3) proceeds.

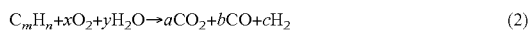

This steam reforming reaction SR is an endothermic reaction, therefore the reaction proceeds as a thermal balance is maintained with the heat of combustion from the combustion chamber 18. At this stage, the fuel cell module 2 is in the final stages of startup, therefore the temperature has risen to a sufficiently high level within the generating chamber 10 so that no major temperature drop is induced in the power generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction POX, the auto-thermal reforming reaction ATR, and the steam reforming reaction SR which proceed in that sequence. Next, when the temperature inside the generating chamber 10 and the temperature of the fuel cell 84 reach a predetermined generating temperature which is lower than the rated temperature at which the cell module 2 can be stably operated, the circuit which includes the fuel cell module 2 is closed, power generation by the fuel cell module 2 begins, and current then flows to the circuit. Generation of electricity by the fuel cell module 2 causes the fuel cell 84 to emit heat, such that the temperature of the fuel cell 84 rises. As a result, the rated temperature at which the fuel cell module 2 is operated becomes, for example, 600° C.-800° C.

Following this, fuel gas and air having respective flow rates greater than those consumed by the fuel cell 84 is applied in order to maintain the rated temperature and continue combustion inside the combustion chamber 18. Generation of electricity by the high reform-efficiency steam reforming reaction SR proceeds while electricity is being generated.

Next, referring to FIG. 8, the operation upon stopping the solid oxide fuel cell (SOFC) device according to the embodiment of the present invention will be explained.

Figure 8:
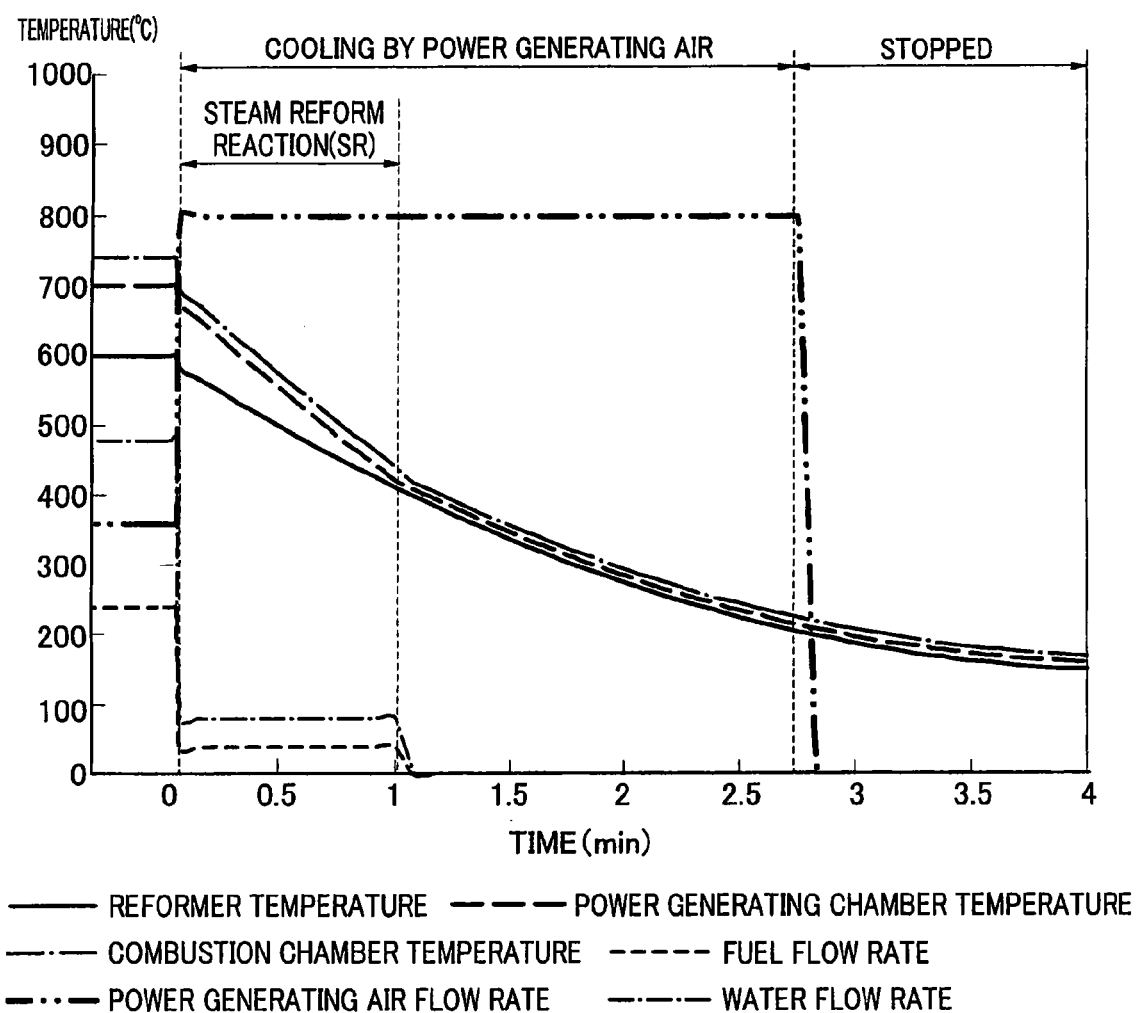
FIG. 8 is a timing chart showing an operation upon stopping a solid oxide fuel cell (SOFC) device according to an embodiment of the present invention.

As shown in FIG. 8, when stopping the operation of the fuel cell module 2, the fuel flow rate regulator unit 38 and the water flow rate regulator unit 28 are first operated to reduce the flow rates of fuel gas and steam being supplied to the reformer 20.

When stopping the operation of the fuel cell module 2, the flow rate of power generating air supplied by the power generating air flow rate regulator unit 45 into the fuel cell module 2 is being increased at the same time that the flow rates of fuel gas and steam being supplied to the reformer 20 is being reduced; the fuel cell assembly 12 and the reformer 20 are air cooled to reduce their temperature. Thereafter, when the temperature of the generating chamber reaches a predetermined temperature, e.g. 400° C., supply of the fuel gas and steam to the reformer 20 is stopped, and the steam reforming reaction SR in the reformer 20 ends. Supply of the power generating air continues until the temperature in the reformer 20 reaches a predetermined temperature, e.g. 200° C.; when the predetermined temperature is reached, the supply of power generating air from the power generating air flow rate regulator unit 45 is stopped.

Thus in the embodiment of the present invention, the steam reforming reaction SR by the reformer 20 and cooling by power generating air are used in combination, therefore when the operation of the fuel cell module 2 is stopped, that operation can be stopped relatively quickly.

Next, referring to FIG. 9 and again to FIG. 7, the startup processing which occurs in a solid oxide fuel cell device 1 according to an embodiment of the present invention will be explained in detail.

Figure 7:
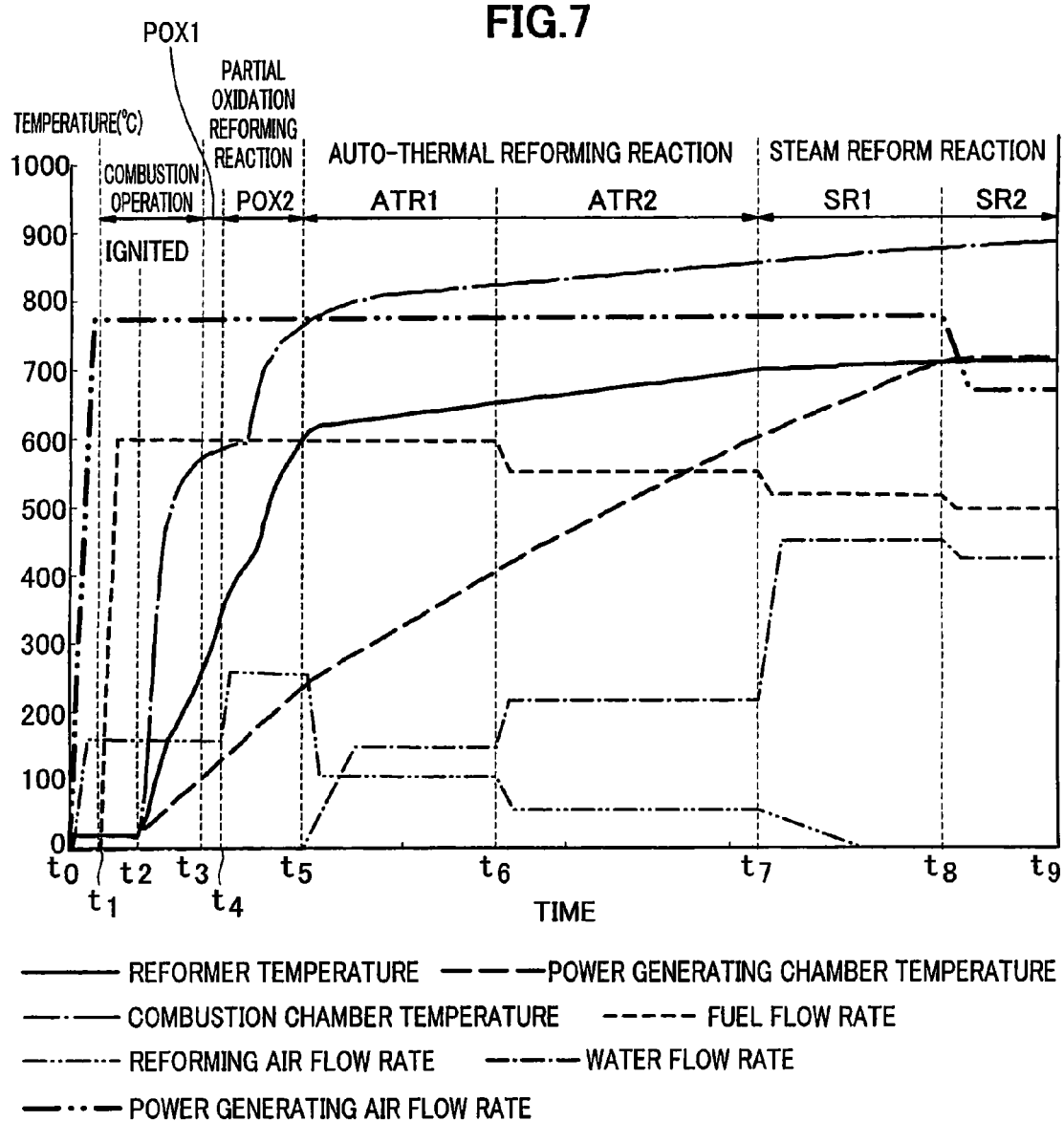
FIG. 7 is a timing chart showing an operation upon startup of a solid oxide fuel cell (SOFC) device according to an embodiment of the present invention.

When the solid oxide fuel cell device 1 is started at time t0 in FIG. 7, the control unit 110 sends a signal to the reforming air flow rate regulator unit 44 which serves as the reforming air supply device, and to the power generating air flow rate regulator unit 45 which serves as the power generating air supply device, thereby starting those devices and supplying reforming air and power generating air to the fuel cell module 2. Note that in the embodiment of the present invention, the flow rate of reforming air supplied when supply begins at time t0 is set at 10 L/min, and the flow rate of power generating air supplied is set at 100 L/min.

Next, at time t1, the control unit 110 sends a signal to the fuel flow rate regulator unit 38 serving as a fuel gas supply device, thereby starting the supply of fuel to the reformer 20. The fuel gas and reforming air fed into the reformer 20 are fed into each of the fuel cell units 16 via the reformer 20, the fuel gas supply line 64, and the manifold 66. The fuel gas and reforming air fed into each of the fuel cell units 16 flows out from the respective top ends of the fuel gas flow paths 98 on each of the fuel cell units 16. In the embodiment of the present invention, the flow rate of fuel gas supplied when supply begins at time t1 is set at 6 L/min (refer to the "combustion operation" state shown in FIG. 9).

In addition, at time t2, the control unit 110 sends a signal to the ignition device 83, igniting the unreformed fuel gas which has flowed out of the top end of the fuel gas flow path 98 on the fuel cell units 16. This results in combustion of the fuel gas in the combustion chamber 18; the reformer 20 disposed thereabove is heated, and the temperature of the combustion chamber 18, power generating chamber 10, and fuel cell stack 14 disposed inside thereof also rise (refer to times t2-t3 in FIG. 7 and to the "combustion operation" state in FIG. 9).

A partial oxidation reforming reaction (POX) occurs in the reformer 20 when the temperature of the reformer 20 rises to approximately 300° C. as a result of heat in the reformer 20 (time t3 in FIG. 7). Since the partial oxidation reforming reaction is an exothermic reaction, the reformer 20 is heated by the heat of the partial oxidation reforming reaction (see the "POX1" state in FIG. 9).

Irrespective of whether all the fuel cell units 16 are completely ignited, at time t2, the time at which ignition is performed by the ignition device 83 is tentatively viewed as the "ignition timing" time. Therefore, the regarding the determination of the effective ignition state, i.e., of whether all the fuel cell units 16 are fully ignited, the control unit 110 determines that all the fuel cell units 16 are fully ignited when the temperature around the top end portion of the fuel cell assembly 12 as detected by the ignition sensor 152 is greater than a predetermined temperature.

The determination of an ignited state by this ignition sensor 152 is effectively made within the region between the start of the supply of fuel to the reformer 20 at time t1, through the ignition timing time t2, and up until the time t3 at which the partial oxidation reforming reaction (POX1) begins (the "combustion operating region" below); and within the region between the start of the POX1 at time t3, up until the transition to POX2 at time t4 (the "POX1 region" below).

Furthermore, when the temperature rises and the temperature of the reformer 20 reaches 350° C. in the POX1 operating region, the control unit 110 sends a signal to the fuel flow rate regulator unit 38 and to the power generating air flow rate regulating unit 45, and sends a signal to the reforming air flow rate regulator unit 44 in a state whereby the fuel supply flow rate and the power generating air supply flow rate are maintained at a fixed level, thereby increasing the supply flow rate of reforming air (see time t4 in FIG. 7).

The fuel supply flow rate is thus maintained at 6 L/min and the power generating air supply flow rate is maintained at 100 L/min, while the reforming air supply flow rate is changed to 18 L/min (see the "POX2" state in FIG. 9). These supply flow rates are appropriate for stably producing a partial oxidation reforming reaction (POX2).

In particular, the fuel supply flow rate is held at a constant level (6 L/min) without variation starting from the combustion operating region, through the POX1, POX2, and ATR1 operating regions (described in detail below), and the regions up to the time t6 at which ATR2 (described in detail below) starts (the combustion operating region, the POX1 operating region, the POX2 operating region, and the ATR1 operating region).

Furthermore, the generating air supply flow rate is held at a constant level (100 L/min) from the combustion operating region through the POX1, POX2, ATR1 (described in detail below), the ATR 2 (described in detail below) and the SR1 (described in detail below) operating regions, and the regions up to the time t8 at which SR2 starts (the combustion operating region, the POX1 operating region, the POX2 operating region, the ATR1 operating region, the ATR2 operating region, and the SR1 operating region).

In other words, in the combustion operating region and the POX1 operating region corresponding to the initial temperature region at which a tentative partial oxidation reforming reaction (POX1) starts to proceed, by holding the flow rate of fuel supply flow rate at a level greater than that of ATR2, and holding the flow rate of power generating air supply flow rate at a level greater than that used for SR2, and by setting the flow rate of reforming air supplied to a level less than that used for POX2, a state is established whereby fuel gases reliably ignite, and air flow at the top end portion of the fuel cell assembly 12 is stabilized. This enables stable flame diffusion and stable ignition (see the "POX1" state in FIG. 9).

The power generating air supply flow rate is held at a high flow rate (100 L/min) starting from the combustion operating region, through the POX1, POX2, ATR1 (described in detail below), the ATR 2 (described in detail below) and the SR1 (described in detail below), and the regions up to the time t8 at which SR2 starts (the combustion operating region, the POX1 operating region, the POX2 operating region, the ATR1 operating region, the ATR2 operating region, and the SR1 operating region). In particular, even if flame diffusion characteristics are improved in the combustion operating region including the ignition timing, and the top end of the fuel gas flow paths 98 on a portion of the fuel cell units 16 of the fuel cell stack 14 are in an ignited state, flame diffusion can be quickly induced over the entire fuel cell stack 14 to achieve complete ignition. Combustion can thus be stabilized even during the period immediately following ignition, which tends to be unstable, and the production of CO and the like can be reliably suppressed.

Furthermore, there is a tendency at the time when the flow rate of power generating air is first increased (time t0-t1 in FIG. 7) for air flow to become turbulent at the top end portion of the fuel cell assembly 12, but reliable ignition can be secured by waiting for a stable air flow period before igniting (time t2 in FIG. 7).

In the combustion operating region and the POX1 region in which a tentative partial oxidation reform reaction is being performed, air flow at the top end portion of the fuel assembly 12 is stabilized by holding both the reforming air and the generating air supply flow rates fixed without variation.

Furthermore, the reforming air supply flow rate in the combustion operating region and the POX1 region is maintained at a level below the power generating air supply flow rate and below the flow rate of reforming air used for a stable partial oxidation reforming reaction (POX2), such that fast flame diffusion characteristics can be achieved.

In the combustion operation region which includes the ignition timing and the POX1 region, reliable ignition characteristics can be assured in the top end portion of the fuel cell assembly 12, which has poor ignition characteristics, by concentrating fuel gas by reducing flow rate of reforming air below that of POX2 and increasing flow rate of fuel gas above that of ATR2.

Next, at time t5 in FIG. 7, when the temperature of the reformer 20 reaches 600° C. or above and the temperature of the fuel cell units 16 reaches 250° C. or above, the control unit 110 sends a signal to the reforming air flow rate regulator unit 44, reducing the flow rate of reforming air supply, and sends a signal to the water flow rate regulator unit 28 serving as the water supply device, starting the supply of water. This results in a change in the flow rate of reforming air supply to 8 L/min and in the flow rate of water supplied to 2 cc/min (see the "ATR1" state in FIG. 9). The steam reforming reaction is also caused to occur in the reformer 20 by the introduction of water (steam) into the reformer 20. In other words, in the "ATR1" state in FIG. 9, an auto-thermal reforming reaction (ATR) takes place, which is a blend of the partial oxidation reforming reaction and the steam reforming reaction.

In the embodiment of the present invention, the temperature of the fuel cells 16 is measured by a power generating chamber temperature sensor 142, which is a temperature detection device disposed inside the power generating chamber 10. Precisely speaking, the temperature inside the power generating chamber 10 and the temperature of the fuel cell units are not the same, but the temperature detected by the power generating chamber temperature sensor 142 reflects the temperature of the fuel cell units 16, and the temperature of the fuel cell units 16 can be grasped by using the power generating chamber temperature sensor 142 disposed inside the power generating chamber 10. Note that in the present specification, the term "fuel cell unit temperature" means a temperature measured by any preferred sensor which indicates a value reflecting the temperature of the fuel cell units.

Furthermore, at time t6 in FIG. 7, when the temperature of the reformer 20 reaches 600° C. or above and the temperature of the fuel cell units 16 reaches 400° C. or above, the control unit 110 sends a signal to the fuel flow rate regulator unit 38 to reduce the flow rate of fuel supplied.

The control unit 110 also sends a signal to the reforming air flow rate regulator unit 44 to reduce the flow rate of reforming air supplied, and sends a signal to the water flow rate regulator unit 28 to increase the flow rate of water supplied. This results in a change of fuel gas flow rate supplied to 4 L/min and a change in the flow rate of reforming air supplied to 4 L/min; the water supply flow rate is set to be 3 cc/min (see the "ATR2" state in FIG. 9). The decrease in the flow rate of reforming air supplied and the increase in the flow rate of water supplied results in a decrease in the proportion of the partial oxidation reforming reaction and an increase in the proportion of the steam reforming reaction within the reformer 20.

Next, at time t7 in FIG. 7, when the temperature of the reformer 20 reaches 650° C. or above and the temperature of the fuel cell units 16 reaches 600° C. or above, the control unit 110 sends a signal to the reforming air flow rate regulator unit 44, stopping the supply of reforming air.

The control unit 110 also sends a signal to the fuel flow rate regulator unit 38 reducing the flow rate of fuel gas supplied, and sends a signal to the water flow rate regulator unit 28 increasing the flow rate of water supplied. This results in a change in the fuel gas supply flow rate to 3 L/min, and a change in the water supply flow rate to 8 cc/min (see the "SR1" state in FIG. 9). Stopping the supply of reforming air stops the partial oxidation reaction in the reformer 20 so that an SR is started, in which only the steam reforming reaction occurs.

Furthermore, at time t8 in FIG. 7, when the temperature in the reformer 20 reaches 650° C. or above and the temperature in the fuel cell units 16 reaches 700° C. or above, the control unit 110 sends a signal to the fuel flow rate regulator unit 38 to reduce the flow rate of fuel gas supplied, and sends a signal to the water flow rate regulator unit 28 to reduce the flow rate of water supplied.

The control unit 110 also sends a signal to the power generating air flow rate regular unit 45 to reduce the flow rate of generating air supplied. This results in a change in the fuel gas supply flow rate to the generation standby fuel gas supply flow rate of 2.3 L/min, as well as a change in the water supply flow rate to 5.8 cc/min, and to a power generating air supply flow rate of 80 L/min (see the "SR2" state in FIG. 9).

After the control unit 110 has maintained these supply flow rates for a predetermined power generation transition interval or greater, electrical power is caused to be output from the fuel cell module 2 to the inverter 54 to start electrical power generation (see time t9 in FIG. 7).

Using the solid oxide fuel cell (SOFC) device of the embodiment of the present invention described above, it is extremely difficult to reliably ignite the top end portions of the fuel assembly 12 in a low temperature atmosphere in which natural ignition does not occur within the fuel cell module 2 in which multiple fuel cell units 16 exist, and it is difficult to carry out stable combustion without causing flameout, but the air flow at the top end proton of the fuel cell assembly 12 can be made stable by keeping the flow rates of fuel gas, reforming air and power generating air fixed without any change whatsoever in the combustion operating region, which includes ignition timing, and in the POX1 operating region. As a result, stable flame diffusion can be achieved, as can reliable ignition and the prevention of inadvertent flameout. Ignition problems can be reliably suppressed and post-ignition flameout can be reliably prevented using a simple structure, without employing countermeasures such as modifying the structure itself of the fuel cell unit 16 structure itself to facilitate ignition.

Also, when using the solid oxide fuel cell (SOFC) device of the embodiment of the present invention, if, after stabilizing the flow rates of fuel gas, reforming air, and generating air without any variations whatsoever in the entirety of the combustion operating region, which includes ignition timing, and in the POX1 operating region, only reforming air is increased in the region where stable partial oxidation reforming (POX2) is conducted, air flow can be stabilized even in environments where natural ignition is difficult, so it is expected that this will be an effective measure in the suppression of ignition problems and flameout.

Furthermore, in the solid oxide fuel cell (SOFC) device of the embodiment of the present invention, the flow rate of fuel gas is held constant without variation starting from the combustion operating region, through POX1, POX2, and ATR1, up to the region in which ATR2 starts (the combustion operating region, the POX1 operating region, the POX2 operating region, and the ATR1 operating region), therefore by maintaining the flow rate of fuel gas at a relatively high level until reaching a relatively high temperature stable region, unstable combustion can be suppressed, and the production of CO and the like can be reliably prevented.

In the solid oxide fuel cell (SOFC) device of the embodiment of the present invention, the flow rate of power generating air is held constant without variation starting from the combustion operating region, through POX1, POX2, ATR1, ATR2, and SR1, up to the region in which SR2 starts (the combustion operating region, the POX1 operating region, the POX2 operating region, the ATR1, ATR2 operating region, and the SR1 operating region), and a stable state is maintained in which there is a plentiful supply quantity of fuel gas, therefore ignition performance and flameout suppression performance can be improved, and, by increasing the flow rate of power generating air, fast flame diffusion characteristics can be assured, so that ignition can be reliably achieved in the top end portions of all the fuel cell assemblies 12, stable combustion can be assured even in the top end portion of the cell assembly 12, where ignition and stable combustion are difficult, and production of CO and the like can be suppressed.

In the solid oxide fuel cell (SOFC) device of the embodiment of the present invention, at the startup before the fuel cell module 2 stats generating power, fast flame diffusion characteristics can be assured by assuring a large predetermined flow rate of power generating air, starting from the combustion operating region which includes the ignition timing and the region surrounding that timing, through the region in which SR1 is implemented, so that even if a portion of the fuel cell units 16 in the fuel cell assembly 12 are in an ignited state, flame can be quickly caused to diffuse over the entirety of the fuel cell assembly 12 to achieve complete ignition. By this means, post-ignition combustion is stabilized, thus enabling the production of CO and the like to be suppressed. At first there is a tendency for air flow to be turbulent when a large flow rate of generating air is first supplied to the top end portion of the fuel cell assembly 12, but reliable ignition can be assured by holding the predetermined large flow rate of power generating air constant in the combustion operating region which includes the ignition timing, and waiting for a period of stable air flow to perform ignition.

Furthermore, although it is extremely difficult to reliably suppress the production of CO and the like due to the environment immediately above the fuel cell assembly 12, where emission characteristics are poor, CO concentration can be reduced to a reliably safe state, and by adopting the philosophy of stabilized airflow, the effects caused by airflow increases can be suppressed, flame diffusion characteristics can be improved, and complete ignition in the upper portion of the fuel-cell assembly can be assured.

The solid oxide fuel cell (SOFC) device according to the embodiment of the present invention in which the flow rate of power generating air is held at a predetermined constant large flow rate, without variation, in the combustion operating region, the POX1 operating region, the POX2 operating region, the ATR1 operating region, the ATR2 operating region, and the SR1 operating region are explained as one example. However, the present invention is not limited to this embodiment, and it is sufficient for the power generating air flow rate to be held constant at a predetermined large flow rate in at least the combustion operating region, the POX1 operating region, the POX2 operating region, the ATR1 operating region, and the ATR2 operating region.

Although the present invention has been explained with reference to specific, preferred embodiments, one of ordinary skilled in the art will recognize that modifications and improvements can be made while remaining within the scope and spirit of the present invention. The scope of the present invention is determined solely by appended claims.

What is claimed is:

1. A solid oxide fuel cell system for generating power by reacting fuel gas and air, comprising:
    a fuel cell assembly having upper and lower portions and comprising multiple solid electrolyte-type fuel cells;
    a reformer disposed above the fuel cell assembly to steam-reform the fuel gas and supply the reformed fuel gas through the fuel cell assembly;
    a water supply device configured to produce pure water and supply the pure water to the reformer;
    a reforming air supply device configured to supply reforming air to the reformer;
    a power generating air supply device configured to supply power generating air towards the upper portion of the fuel cell assembly through spaces between the multiple fuel cells in the fuel cell assembly;
    an ignition device positioned to ignite and burn the fuel gas supplied to the lower portion of the fuel cell assembly from the reformer and then flown out from the upper portion of the fuel cell assembly; and
    a control device programmed to operate the fuel gas supply device, the water supply device, the reforming air supply device, the power generating air supply device, and the ignition device to thermally prepare the solid oxide fuel cell system for generation of electrical power through a series of consecutive operations comprising a combustion operation in which the ignition device ignites and burns the fuel gas with the air, an auto-thermal reforming reaction (ATR) operation in which the fuel gas, the reforming air and the pure water are supplied to the reformer for an auto-thermal reforming reaction, and a steam reforming reaction (SR) operation in which the fuel gas and the pure water are supplied to the reformer for a steam reforming reaction,
    the control device being further programmed to operate the fuel gas supply device, the reforming air supply device and the power generating air supply device to supply the fuel gas, the reforming air and the power generating air at constant supply rates during a predetermined time period continuous from before through after an ignition of the fuel gas by the ignition device.

2. The solid oxide fuel cell system according to claim 1, wherein ATR operation comprises a first auto-thermal reforming reaction (ATR1) operation and a second auto-thermal reforming reaction (ATR2) operation which runs in a temperature region higher than, and with a smaller supply of the reforming air and a larger supply of the pure water than, those of the first auto-thermal reforming reaction (ATR1), and the control device is programmed to operate the fuel gas supply device to supply the fuel gas at a constant supply rate throughout the combustion operation and the ATR1 operation.

3. The solid oxide fuel cell system according to claim 1, wherein the control device is programmed to operate the generating air supply device to supply the power generating air at a constant supply rate throughout at least the combustion operation and the ATR operation.

4. The solid oxide fuel cell system according to claim 1, wherein the control device is programmed to operate the power generating air supply device to supply the power generating air during the combustion operation, the ATR operation, and the SR operation, and further programmed to operate the power generating air supply device to supply the power generating air at a maximum and fixed supply rate during at least the combustion operation.

5. A solid oxide fuel cell system for generating power by reacting fuel gas and air, comprising:
    a fuel cell assembly comprising multiple solid electrolyte-type fuel cells which is thermally prepared for generation of electrical power through a series of successive operations comprising a combustion operation, an operation for auto-thermal reforming reaction (ATR) and an operation for steam reforming reaction (SR);
    a reformer configured to steam-reform fuel gas with water and reforming air and supply the reformed fuel gas through the multiple fuel cells in the fuel cell assembly;
    a fuel gas supply device configured to supply the fuel gas to the reformer;
    a water supply device configured to supply water to the reformer;
    a reforming air supply device configured to supply reforming air to the reformer;
    a power generating air supply device configured to supply power generating air through spaces between the multiple fuel cells in the fuel cell assembly;
    an ignition device configured to ignite and burn the fuel gas flown out from the fuel cell assembly; and
    a controller programmed to operate the fuel gas supply device, the reforming air supply device and the power generating air supply device to supply the fuel gas, the reforming air and the power generating air at constant supply rates during a predetermined time period continuous from before through after an ignition of the fuel gas by the ignition device.

6. The solid oxide fuel cell system according to claim 5, wherein the ATR operation comprises a first stage operation for auto-thermal reforming reaction (ATR1) and a second stage operation for auto-thermal reforming reaction (ATR2), and the controller is programmed to operate the fuel gas supply device to supply the fuel gas at a constant supply rate throughout the combustion operation, and the ATR1 operation.

7. The solid oxide fuel cell system according to claim 5, wherein the controller is programmed to operate the generating air supply device to supply the power generating air at a constant supply rate throughout at least the combustion operation and the ATR operation.

8. The solid oxide fuel cell system according to claim 5, wherein the controller is programmed to operate the power generating air supply device to supply the power generating air during the combustion operation, the ATR operation, and the SR operation, and the controller is further programmed to operate the power generating air supply device to supply the power generating air at a maximum, fixed supply rate during at least the combustion operation.

* * * * *

UNITED STATES PATENT AND TRADEMARK OFFICE
CERTIFICATE OF CORRECTION

PATENT NO. : 8,974,978 B2  
APPLICATION NO. : 12/787851  
DATED : March 10, 2015  
INVENTOR(S) : Ooe et al.

Page 1 of 1

It is certified that error appears in the above-identified patent and that said Letters Patent is hereby corrected as shown below:

<u>In the Claims</u>

Column 17, claim 1, line 45, after "fuel cell assembly;" insert

--a fuel gas supply device configured to supply the fuel gas to the reformer;--.

Signed and Sealed this  
Third Day of November, 2015

Michelle K. Lee  
*Director of the United States Patent and Trademark Office*